(12) United States Patent
Kosaka

(10) Patent No.: US 9,140,889 B2
(45) Date of Patent: Sep. 22, 2015

(54) FINDER OPTICAL SYSTEM AND LIGHT METERING OPTICAL SYSTEM AND IMAGE PICKUP APPARATUS INCLUDING THE SAME

(71) Applicant: CANON KABUSHIKI KAISHA, Tokyo (JP)

(72) Inventor: Yuichi Kosaka, Koga (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 14/189,718

(22) Filed: Feb. 25, 2014

(65) Prior Publication Data

US 2014/0240583 A1 Aug. 28, 2014

(30) Foreign Application Priority Data

Feb. 26, 2013 (JP) ................................ 2013-035913

(51) Int. Cl.
G02B 25/00 (2006.01)
H04N 5/235 (2006.01)
H04N 5/232 (2006.01)

(52) U.S. Cl.
CPC .............. *G02B 25/001* (2013.01); *H04N 5/235* (2013.01); *H04N 5/2351* (2013.01); *H04N 5/23212* (2013.01); *H04N 5/23296* (2013.01)

(58) Field of Classification Search
CPC ........ G03B 13/02; G03B 13/20; G03B 13/06; G03B 19/18; G03B 17/53; G03B 17/06; G03B 17/38; G03B 7/08; G03B 7/091; G03B 7/16; G03B 7/28; G03B 15/05; G02B 23/14; G02B 25/001; H04N 5/2351; H04N 5/235; H04N 5/23296; H04N 5/23212
See application file for complete search history.

(56) References Cited

U.S. PATENT DOCUMENTS

| | | | | |
|---|---|---|---|---|
| 3,952,321 A | * | 4/1976 | Matui | 396/384 |
| 4,437,750 A | * | 3/1984 | Ikari | 396/382 |
| 5,371,568 A | * | 12/1994 | Takagi et al. | 396/157 |
| 5,450,163 A | * | 9/1995 | Iwasaki | 396/234 |
| 6,154,612 A | * | 11/2000 | Iwasaki | 396/61 |
| 7,254,321 B2 | * | 8/2007 | Tokunaga | 396/61 |
| 7,676,148 B2 | * | 3/2010 | Hosoi | 396/157 |
| 7,894,715 B2 | * | 2/2011 | Osawa | 396/61 |
| 2008/0138056 A1 | * | 6/2008 | Hosoi | 396/164 |
| 2009/0097128 A1 | * | 4/2009 | Yokoyama | 359/645 |
| 2009/0245775 A1 | * | 10/2009 | Osawa | 396/61 |

FOREIGN PATENT DOCUMENTS

JP S63-74042 A 4/1988
JP 2007-093888 A 4/2007

* cited by examiner

*Primary Examiner* — Pritham Prabhakher
(74) *Attorney, Agent, or Firm* — Canon USA Inc IP Division

(57) ABSTRACT

A finder optical system includes an erecting optical system, an eyepiece optical system, and a light metering optical system. An optical axis of the light metering optical system is non-parallel to an optical axis of the eyepiece optical system. The light metering optical system includes a first lens having positive refractive power and a second lens having negative refractive power in this order from a side of the erecting optical system to a side of an image sensor, and the second lens is a prism body reflecting a light flux incoming from an incident surface off an inner reflection surface and outputting the light flux from a light outputting surface.

9 Claims, 6 Drawing Sheets

FINDER OPTICAL SYSTEM AND LIGHT METERING OPTICAL SYSTEM AND IMAGE PICKUP APPARATUS INCLUDING THE SAME

BACKGROUND

1. Field of Art

The present disclosure relates to a finder optical system and an image pickup apparatus including the same. The present disclosure specifically relates to a finder optical system and a light metering optical system which are suitable for an image pickup apparatus such as a single-lens reflex camera. The finder optical system includes an eyepiece optical system and a light metering optical system. The eyepiece optical system allows an observer to observe an object image formed on a focusing screen. The light metering optical system is configured to re-image the object image formed on the focusing screen on an image sensor to provide an electronic image.

2. Description of the Related Art

In a finder optical system in Japanese Patent Application Laid-Open No. 2007-93888, an electronic image is obtained by re-imaging an object image formed on a focusing screen on an image sensor in a light metering optical system via an erecting optical system. The finder optical system has a function of recognizing a face of an object and adjusting focus and exposure, a function of moving a focusing point along with movement of the object, and a function of displaying the object image in real time on a liquid crystal screen provided on a back surface of a camera body. The finder optical system in Japanese Patent Application Laid-Open No. 2007-93888 also includes on a light exit side of a pentagonal prism a light path dividing unit. The light path dividing unit is a half mirror for dividing a light path into a path for guiding light to the image sensor via the light metering optical system and a path for guiding light to an eyepiece optical system.

Also is known a camera light metering apparatus in which light receiving lenses constituting an eyepiece optical system and a light metering optical system are arranged side by side on a side of a light exit surface of a pentagonal roof prism. In Japanese Patent Application Laid-Open No. 63-74042, a light metering lens including an inner reflection surface is used as the light metering optical system to guide a light flux exiting from the pentagonal roof prism to a light receiving element.

To pick up a bright and high-quality electronic image at the time of picking up an image by forming an object image on the image sensor with use of the light metering optical system, a bright light metering optical system and a high-pixel-number and large-sized image sensor are required.

On the other hand, to observe the object image formed on a focusing screen in a bright state, a large-diameter lens needs to be used for the eyepiece optical system.

To pick up a high-quality image in real time and observe a bright object image via the eyepiece optical system, the light metering optical system including the large-sized image sensor and the large-diameter eyepiece optical system must be arranged side by side on the light exit side of an erecting optical system. However, the image sensor and the eyepiece optical system mechanically interfere with each other, which makes it difficult to dispose both of them.

As shown in the light metering apparatus in Japanese Patent Application Laid-Open No. 63-74042, by inclining an optical axis of the light metering optical system toward an optical axis of the eyepiece optical system, mutual interference can be avoided easily. However, when the object image formed on the focusing screen is re-imaged on the image sensor in a state in which the optical axis of the light metering optical system is inclined toward a normal line of the focusing screen, asymmetric curvature of field and astigmatism occur depending on an image height, which makes it difficult to pick up a high-quality image.

SUMMARY

According to an aspect of the present disclosure, a finder optical system includes an erecting optical system causing an object image formed on a focusing screen by an imaging optical system, to be an erect image, an eyepiece optical system forming the object image caused to be the erect image by the erecting optical system, and a light metering optical system forming the object image focused on the focusing screen, on an image sensor via the erecting optical system. An optical axis of the light metering optical system is non-parallel to an optical axis of the eyepiece optical system, the light metering optical system includes a first lens having positive refractive power and a second lens having negative refractive power in this order from a side of the erecting optical system to a side of the image sensor, and the second lens is a prism body reflecting a light flux from an incident surface off an inner reflection surface and outputting the light flux from a light outputting surface.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A finder optical system according to an exemplary embodiment of the present invention includes an erecting optical system such as a pentagonal roof prism causing an object image formed on a focusing screen by an imaging optical system (objective lens) to be an erect image. The finder optical system also includes an eyepiece optical system enlarging and forming as a virtual image the object image which is the erect image made by the erecting optical system. The finder optical system further includes a light metering optical system for shrinking and imaging the object image formed on the focusing screen, on an image sensor via the erecting optical system. An optical axis of the light metering optical system passes through a center of the focusing screen and is inclined (non-parallel) toward an optical axis of the eyepiece optical system.

An image picked up by the image sensor is utilized for recognition and display of the object image and is utilized for measurement (light metering) of brightness of an object. The light metering optical system and the eyepiece optical system are arranged so that respective surfaces thereof on a side of light entrance is opposed to a surface of the erecting optical system on a side of light exit. In addition, the light metering optical system is arranged on an opposite side of the imaging optical system with respect to the optical axis of the eyepiece optical system.

The light metering optical system includes an aperture stop, a first lens having positive refractive power, and a second lens having negative refractive power in this order from a side of the erecting optical system to a side of the image sensor. The second lens is a prism body specularly or totally reflecting a light flux incoming from a light entrance surface on an inner reflection surface and outputting the light flux from a light outputting surface.

Figure 1:
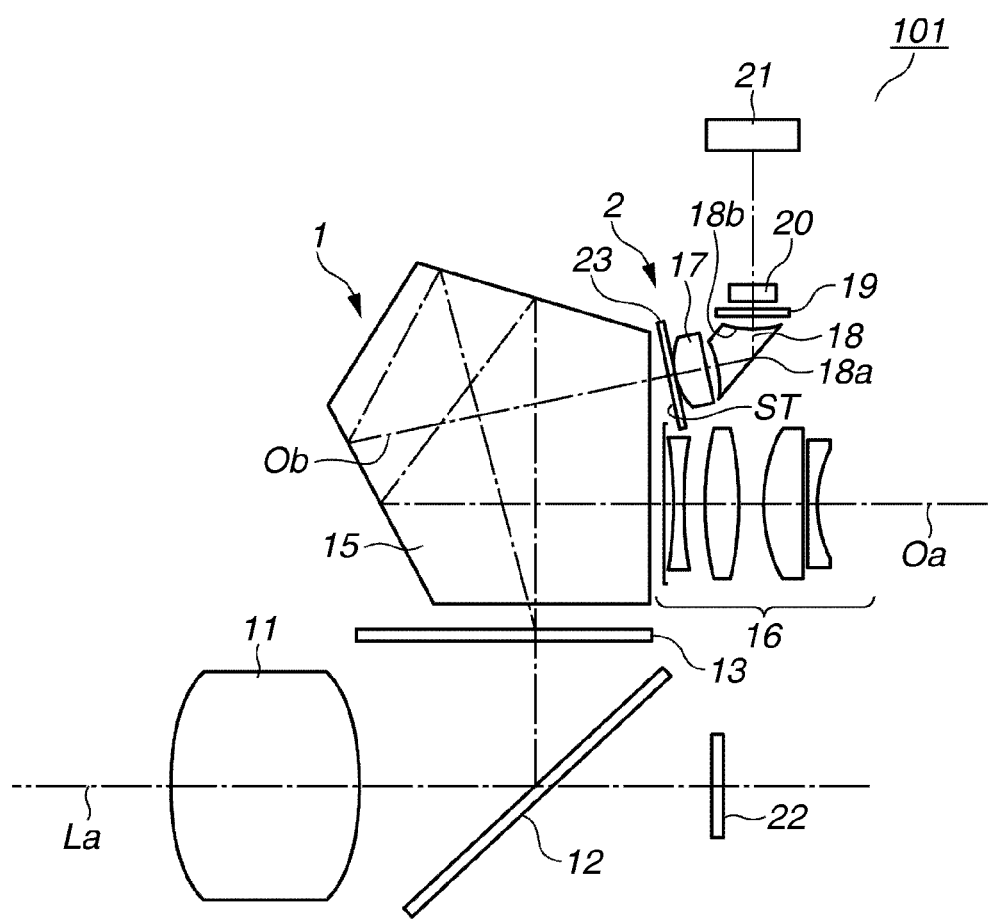
FIG. 1 is a schematic configuration diagram of an image pickup apparatus including a finder optical system according to an exemplary embodiment of the present invention.
Figure 2:
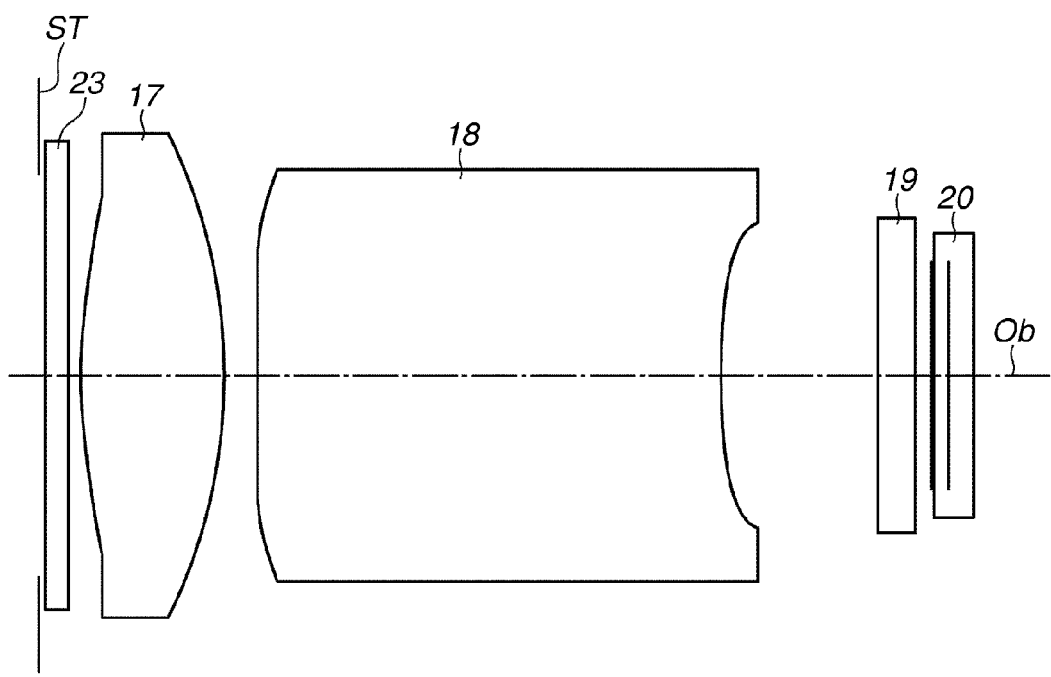
FIG. 2 is a developed view along an optical axis of a light metering optical system of a finder optical system according to a first exemplary embodiment of the present invention.

FIG. 1 is a schematic view of a main part of an image pickup apparatus (a single-lens reflex camera) including a finder optical system 101 according to an exemplary embodiment of the present invention. FIG. 2 is a developed view along an optical axis in a light metering optical system of a finder optical system according to a first exemplary embodiment of the present invention.

In the image pickup apparatus in FIG. 1, when an object image is observed through the finder optical system, light passing through an imaging optical system (objective lens) 11 is reflected on a quick return mirror 12, and the object image is formed on a focusing screen 13.

The object image formed on the focusing screen 13 by the imaging optical system 11 becomes erected by a pentagonal roof prism 15. The erect image is observed by an observer through an eyepiece optical system 16. The finder optical system also includes a light metering optical system 2 having an optical axis Ob passing through a center of the focusing screen 13 and inclining toward an optical axis Oa of the eyepiece optical system 16.

The light metering optical system 2 of the finder optical system according to the first exemplary embodiment is arranged on an upper side of the eyepiece optical system 16. The upper side of the eyepiece optical system 16 means an opposite direction of the imaging optical system 11 with respect to the optical axis Oa of the eyepiece optical system 16. The light metering optical system 2 includes an aperture stop ST, a dust-proof filter 23, a first lens 17 having positive refractive power, and a second lens 18 having negative refractive power in this order from a side of the pentagonal roof prism 15 to a side of an image sensor 20. The second lens 18 is provided with a reflection surface (rear reflection surface) 18a utilizing specular reflection or total reflection, and a light path of the light metering optical system 2 is bent upward. The finder optical system includes a filter 19 such as a low-pass filter and an IR (near-infrared) cut filter and the image sensor 20 such as a charge-coupled device (CCD).

By arranging a lens surface 18b of the second lens 18 on a side of the image sensor 20 and the image sensor 20 above the eyepiece optical system 16, mechanical interference between the light metering optical system 2 and the eyepiece optical system 16 can be avoided. Alternatively, by bending the light path of the light metering optical system 2 in a direction vertical to the drawing sheet in FIG. 1, mechanical interference between the light metering optical system 2 and the eyepiece optical system 16 can also be avoided.

The object image formed on the image sensor 20 by the light metering optical system 2 is subjected to image processing at an image processing unit 21 and is displayed in real time on a liquid crystal screen provided on a back surface of a camera body. The object image is also used for focusing along with movement of a main object in the image.

An image sensor 22 is a charge coupled device (CCD) or a complementary metal-oxide semiconductor (CMOS) recording (light-receiving) the object image formed by the imaging optical system 11 when the quick return mirror 12 is turned upward.

FIG. 2 is a developed view of the light metering optical system 2, and the filter 19 and the image sensor 20 arranged close to the light metering optical system 2 in the finder optical system according to the first exemplary embodiment when the light metering optical system 2, the filter 19, and the image sensor 20 are developed along the optical axis Ob. The light metering optical system 2 includes the aperture stop ST, the dust-proof filter 23, the first lens 17, and the second lens 18 in this order from an object side (a side of the pentagonal roof prism 15). In a case where image forming is performed only by the first lens 17, image forming performance is relatively favorable around the optical axis Ob. However, since a Petzval sum is large, curvature of field and astigmatism cannot be corrected at an area away from the optical axis Ob, and image forming performance on the periphery cannot be secured. Under such circumstances, by introducing the second lens 18 having negative refractive power and decreasing the Petzval sum, curvature of field and astigmatism can be corrected to secure image forming performance on the periphery.

More desirably, the surface 18b of the second lens 18 on the side of the image sensor 20 has negative refractive power and is in an aspheric shape in which an absolute value of the refractive power increases from a center to a periphery. The curvature of field is aberration in which an image forming position in an axial direction of light is displaced depending on an image height and is corrected most effectively when it is corrected at the lens surface 18b, which is closest to the image sensor 20. When correction of the Petzval sum is insufficient, an image plane is curved in a direction of the second lens 18 from a center to a periphery. Accordingly, the surface 18b of the second lens 18 on the side of the image sensor 20 is formed in the aspheric shape in which the absolute value of the refractive power increases from the center to the periphery, so that the image forming position of a peripheral light flux shifts to the image sensor 20 side and the curvature of field can be corrected favorably.

A focal length of the entire lens of the light metering optical system 2 is f while a focal length of the second lens 18 is f2. At this time, the following condition is desirably satisfied.

$$f2/f < -1.9 \quad (1)$$

Condition (1) relates to a ratio between the focal length of the second lens 18 and the focal length of the entire lens of the light metering optical system 2. By satisfying Condition (1), various kinds of aberration such as the curvature of field can be reduced easily. An upper limit of Condition (1) should not be exceeded since this makes it difficult to correct various kinds of aberration such as the curvature of field, which lowers an image quality around the screen.

Figure 3:
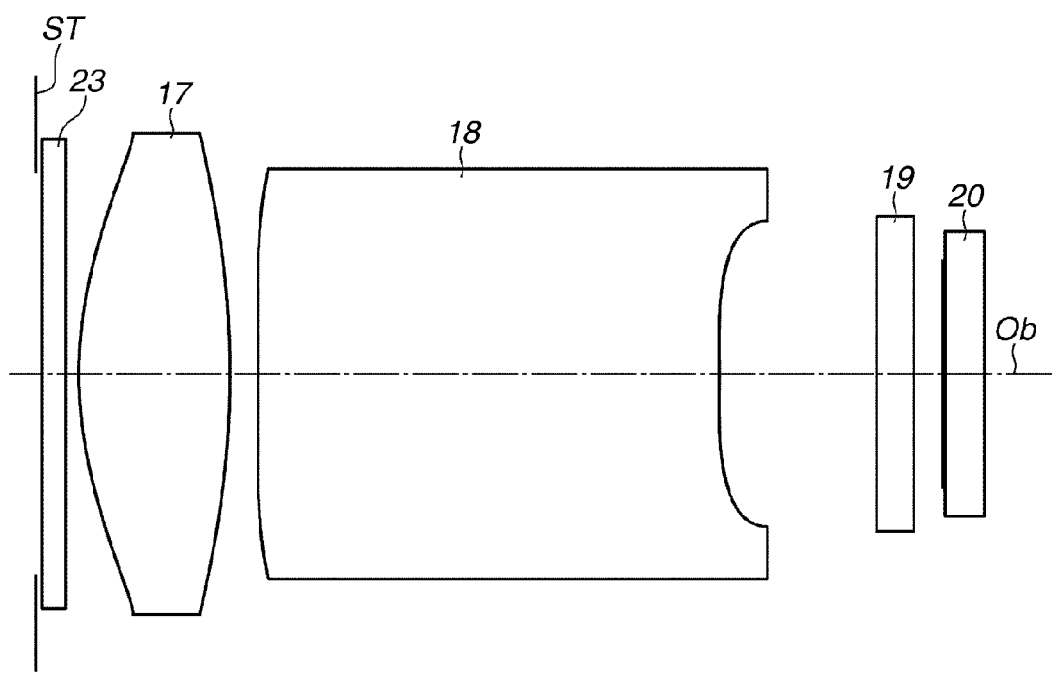
FIG. 3 is a developed view along an optical axis of a light metering optical system of a finder optical system according to a second exemplary embodiment of the present invention.

FIG. 3 is a developed view of the light metering optical system 2, and the filter 19 and the image sensor 20 arranged close to the light metering optical system 2 in a finder optical system according to a second exemplary embodiment when the light metering optical system 2, the filter 19, and the image sensor 20 are developed along the optical axis Ob. The second exemplary embodiment has a basic configuration in common with the first exemplary embodiment and differs from the first exemplary embodiment only in terms of shapes of the first lens 17 and the second lens 18.

Figure 4:
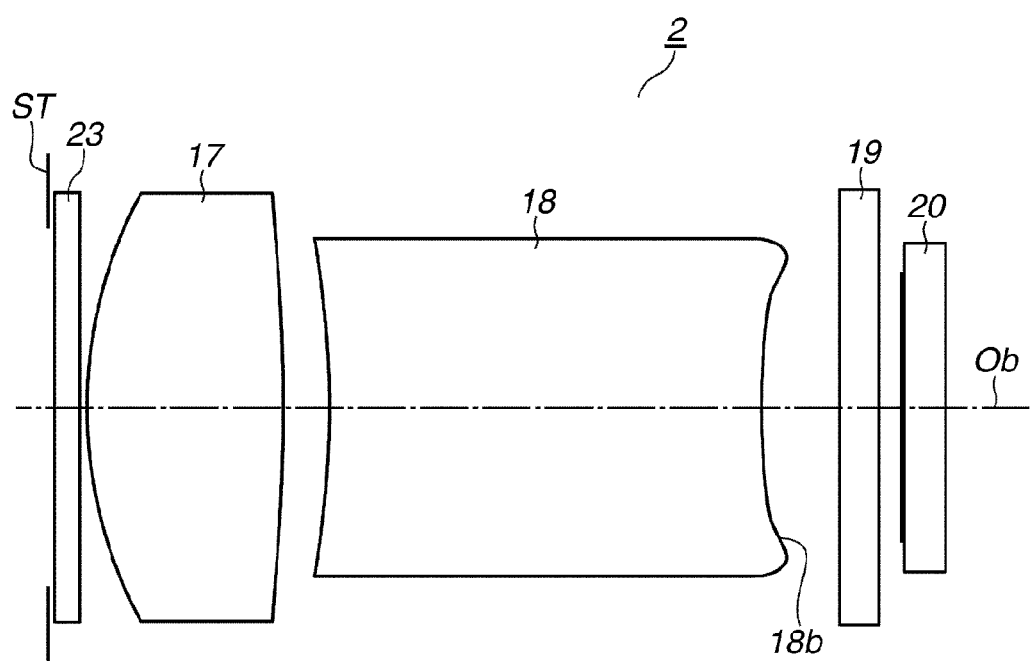
FIG. 4 is a developed view along an optical axis of a light metering optical system of a finder optical system according to a third exemplary embodiment of the present invention.
Figure 5:
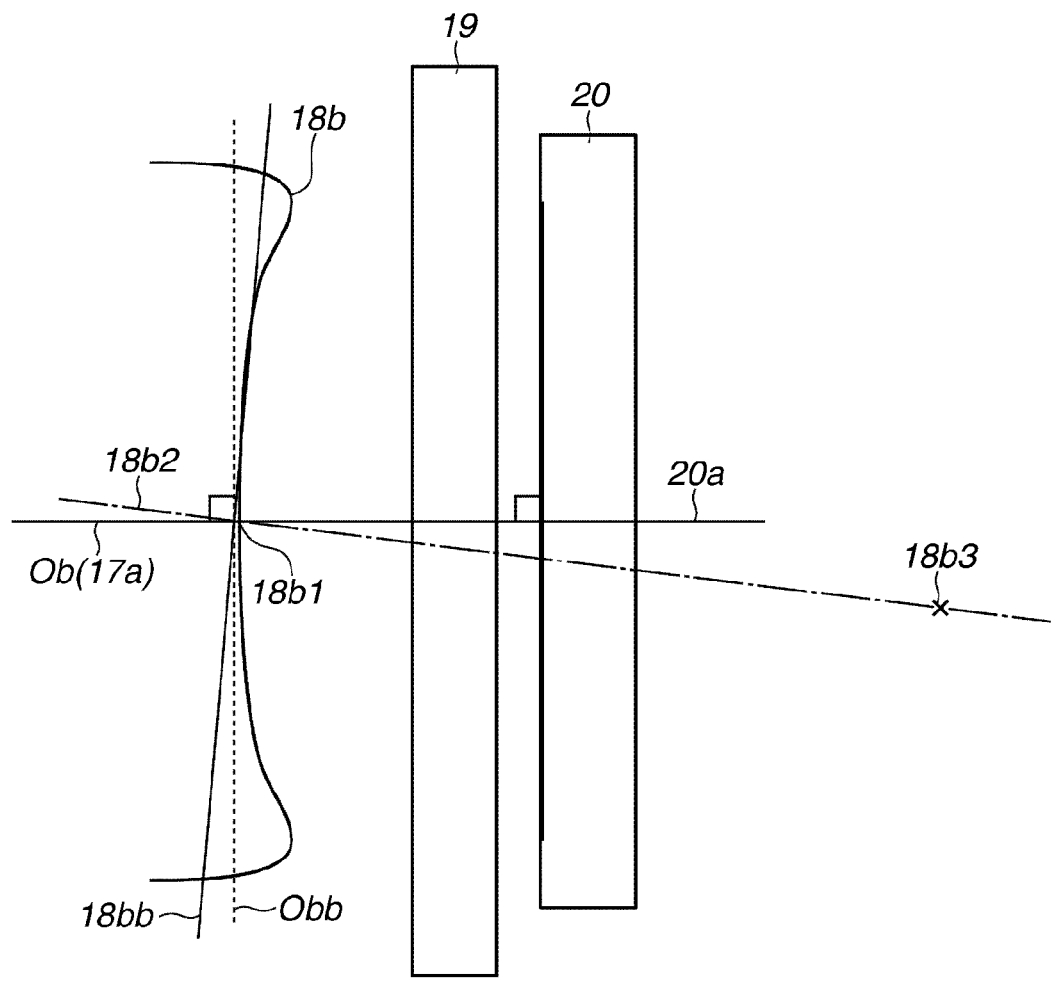
FIG. 5 is an enlarged view around a surface of a second lens on a side of an image sensor in the light metering optical system of the finder optical system according to the third exemplary embodiment of the present invention.

The light metering optical system 2 in a finder optical system according to a third exemplary embodiment will be described with reference to FIGS. 4 and 5. FIG. 4 is a developed view of the light metering optical system 2, and the filter 19 and the image sensor 20 arranged close to the light metering optical system 2 in the finder optical system according to the third exemplary embodiment when the light metering optical system 2, the filter 19, and the image sensor 20 are developed along the optical axis Ob. FIG. 5 is an enlarged view around the surface 18b of the second lens 18.

FIG. 5 has a tangent line (a tangent plane) 18bb to a top 18b1 as an intersection point of the lens surface 18b with the optical axis Ob (an optical axis 17a of the first lens 17) of the light metering optical system 2. FIG. 5 also has a perpendicular line Obb to the optical axis Ob of the light metering optical system 2. FIG. 5 further has a normal line (a surface normal) 18b2 passing the top 18b1. A center of curvature 18b3 of the lens surface 18b is located off the optical axis Ob of the light metering optical system 2. The optical axis Ob of the light metering optical system 2 is inclined (non-parallel) toward the optical axis Oa of the eyepiece optical system 16.

In the present exemplary embodiment, the optical axis Ob of the light metering optical system 2 is parallel to a normal line 20a of an image pickup surface of the image sensor 20. Since the light metering optical system 2 picks up the object image on the focusing screen 13 in an oblique direction, an upper side and a lower side of the image sensor 20 have different image forming characteristics. In the present exemplary embodiment, to eliminate this difference in image forming characteristics, the surface 18b closest to the image sensor 20 is inclined toward the normal line 20a of the image sensor 20. In the present exemplary embodiment, the normal line 18b2 passing the top 18b1 of the lens surface 18b is inclined at an angle of 2.5° toward the optical axis Ob of the light metering optical system 2 in a direction of the optical axis Oa of the eyepiece optical system 16. That is, the normal line 18b2 passing the top 18b1 of the lens surface 18b is inclined to be nearly parallel to the optical axis Oa of the eyepiece optical system 16 compared with the optical axis Ob of the light metering optical system 2 is. Thus, the difference in image forming characteristics occurring between the upper side and the lower side of the image sensor 20 is reduced, and a favorable image can be picked up over the entire screen.

Figure 6:
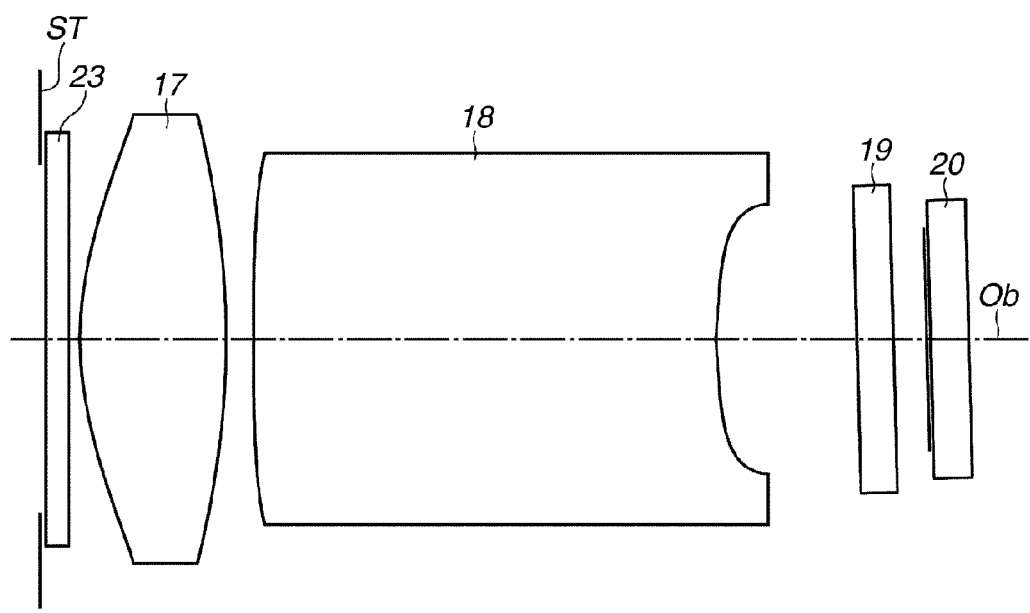
FIG. 6 is a developed view along an optical axis in the light metering optical system of a finder optical system according to a fourth exemplary embodiment of the present invention.

The light metering optical system 2 in a finder optical system according to a fourth exemplary embodiment will be described with reference to FIG. 6. In the present exemplary embodiment, the normal line 18b2 passing the top 18b1 of the lens surface 18b is inclined at an angle of 1.5° in a direction of the optical axis Oa of the eyepiece optical system 16 toward the optical axis Ob of the light metering optical system 2. That is, the normal line 18b2 passing the top 18b1 of the lens surface 18b is inclined to be nearly parallel to the optical axis Oa of the eyepiece optical system 16 compared with the optical axis Ob of the light metering optical system 2.

Also, the normal line 20a of the image sensor 20 is inclined (i.e., non-parallel) at an angle of 1.0° in a direction away from the optical axis Oa of the eyepiece optical system 16 toward the optical axis Ob of the light metering optical system 2. That is, the normal line 20a of the image sensor 20 is inclined to become less parallel to the optical axis Oa of the eyepiece optical system 16 than to the optical axis Ob of the light metering optical system 2. Thus, the difference in image forming characteristics occurring between the upper side and the lower side of the image sensor 20 is reduced, and a favorable image can be picked up over the entire screen.

Next, numerical examples of the light metering optical systems in the finder optical systems of each exemplary embodiment will be described. In the numerical examples, "i" represents an order of a surface where the aperture stop ST is a first surface (r1). "ri" represents a paraxial curvature radius of an i-th surface including the aperture stop ST. "d0" represents a distance between the aperture stop ST and a designed dummy surface (r2). "di" represents an axial surface distance between an (i+1)-th surface from the aperture stop ST and an (i+2)-th surface. Further, "Ni" represents a refractive index of an i-th material from the aperture stop ST in terms of a d line (wavelength=578.56 nm), and "vi" represents an Abbe number of an i-th material from the aperture stop ST in terms of the d line. Further, "f" is a focal length, and "FNO." is an F-number.

"r1" represents the aperture stop ST, "r2" represents the designed dummy surface, and "r3" and "r4" represent each surface of the dust-proof filter 23. "r5" and "r6" represent each surface of the first lens 17, and "r7" and "r8" represent each surface of the second lens 18. "r9" and "r10" represent each surface of the filter 19. "r11" corresponds to the image sensor 20. The aspheric surface shape is defined by the following equation.

$$x = \frac{\frac{h^2}{R}}{1+\sqrt{1-\left(\frac{h}{R}\right)^2}} + \sum_j C_j h^j$$

In the equation representing the aspheric surface shape, "x" is a distance from a top of a lens surface in an axial direction of light, "h" is a height in a direction vertical to an optical axis, and "R" is a paraxial curvature radius at a top of a lens surface. "$C_j$" is an aspheric coefficient. "E-i" represents an exponential expression where the base is 10, that is, "$10^{-i}$."

NUMERICAL EXAMPLE 1

| f = 7.055 FNO. = 1.50 | | | |
|---|---|---|---|
| Curvature radius[mm] | Axial surface distance[mm] | Refractive index(Nd) | Abbe number(vd) |
| r1 = ∞ | d0 = 2 | | |
| r2 = ∞ | d1 = 0.1 | | |
| r3 = ∞ | d2 = 0.300 | N1= 1.523 | v1 = 58.6 |
| r4 = ∞ | d3 = 0.100 | | |
| r5 = 7.741153 | d4 = 1.86 | N2 = 1.58913 | v2 = 61.28 |
| r6 = −7.13296 | d5 = 0.427 | | |
| r7 = 192.91412 | d6 = 6.00 | N3 = 1.58306 | v3 = 30.23 |
| r8 = 23.89 | d7 = 2.00 | | |
| r9 = ∞ | d8 = 0.5 | N4 = 1.52 | v4 = 55.0 |
| r10 = ∞ | d9 = 0.4 | | |
| r11 = ∞ | | | |

-continued f = 7.055 FNO. = 1.50

[Aspheric coefficient]
Surface number r5 C4 = 7.479583E−005 C6 = −1.271707E−003 C8 = 1.189772E−004
C10 = −3.296993E−006 C12 = 0
r7 C4 = −3.283715E−003 C6 = 3.293603E−003 C8 = −5.410181E−004
C10 = 3.855315E−005 C12 = −7.644431E−007
r8 C4 = 6.903753E−003 C6 = −3.719096E−003 C8 = 8.556452E−003
C10 = −1.089785E−002 C12 = 6.938947E−003 C14 = −1.939813E−003
C16 = 1.954886E−004
f2/f = −27.3

NUMERICAL EXAMPLE 2 f = 7.055 FNO. = 1.50

| Curvature radius[mm] | Axial surface distance[mm] | Refractive index(Nd) | Abbe number(νd) |
|---|---|---|---|
| r1 = ∞ | d0 = 2 | | |
| r2 = ∞ | d1 = 0.1 | | |
| r3 = ∞ | d2 = 0.300 | N1 = 1.523 | ν1 = 58.6 |
| r4 = ∞ | d3 = 0.100 | | |
| r5 = 5.52630 | d4 = 1.86 | N2 = 1.58913 | ν2 = 61.28 |
| r6 = −12.89385 | d5 = 0.40 | | |
| r7 = ∞ | d6 = 6.00 | N3 = 1.58306 | ν3 = 30.23 |
| r8 = 32.60351 | d7 = 2.00 | | |
| r9 = ∞ | d8 = 0.5 | N4 = 1.52 | ν4 = 55.0 |
| r10 = ∞ | d9 = 0.4 | | |
| r11 = ∞ | | | |

[Aspheric coefficient]
Surface number r5 C4 = −8.236507E−004 C6 = −4.410039E−004 C8 = 8.316892E−005 C10 = −8.480376E−006 C12 = 2.535400E−007
r7 C4 = 3.513226E−004 C6 = 7.475901E−004 C8 = −1.886682E−004
C10 = 2.626060E−005 C12 = −1.324787E−006
r8 C4 = 1.836866E−002 C6 = −1.727160E−002 C8 = 1.981183E−002
C10 = −1.602779E−002 C12 = 8.034174E−003 C14 = −2.134174E−003
C16 = 2.267634E−004
f2/f = −7.93

NUMERICAL EXAMPLE 3 f = 6.7 FNO. = 1.50

| Curvature radius[mm] | Axial surface distance[mm] | Refractive index(Nd) | Abbe number(νd) |
|---|---|---|---|
| r1 = ∞ | d0 = 2 | | |
| r2 = ∞ | d1 = 0.1 | | |
| r3 = ∞ | d2 = 0.300 | N1 = 1.523 | ν1 = 58.6 |
| r4 = ∞ | d3 = 0.100 | | |
| r5 = 5.3218 | d4 = 2.500 | N2 = 1.851 | ν2 = 40.1 |
| r6 = −26.5344 | d5 = 0.600 | | |
| r7 = −12.155202 | d6 = 5.500 | N3 = 1.585 | ν3 = 29.0 |
| r8 = 23.89 | d7 = 1 | | |
| r9 = ∞ | d8 = 0.5 | N4 = 1.52 | ν4 = 55.0 |
| r10 = ∞ | d9 = 0.4 | | |
| r11 = ∞ | | | |

[Aspheric coefficient]
Surface number r5 C4 = −6.3570E−004 C6 = 1.0903E−004 C8 = −2.3442E−005
C10 = 2.4558E−006 C12 = −1.0866E−007
r8 C4 = −4.8762E−002 C6 = 1.2243E−001 C8 = −1.1818E−001

-continued f = 6.7 FNO. = 1.50

C10 = 6.4041E−002 C12 = −1.9210E−002
f2/f = −1.945

NUMERICAL EXAMPLE 4 f = 7.30 FNO. = 1.50

| Curvature radius[mm] | Axial surface distance[mm] | Refractive index(Nd) | Abbe number(νd) |
|---|---|---|---|
| r1 = ∞ | d0 = 2 | | |
| r2 = ∞ | d1 = 0.1 | | |
| r3 = ∞ | d2 = 0.300 | N1 = 1.523 | ν1 = 58.6 |
| r4 = ∞ | d3 = 0.100 | | |
| r5 = 5.52630 | d4 = 1.930 | N2 = 1.58913 | ν2 = 61.28 |
| r6 = −12.8938 | d5 = 0.427 | | |
| r7 = ∞ | d6 = 6.00 | N3 = 1.58306 | ν3 = 30.23 |
| r8 = 32.60351 | d7 = 3.071 | | |
| r9 = ∞ | d8 = 0.5 | N4 = 1.52 | ν4 = 55.0 |
| r10 = ∞ | d9 = 0.4 | | |
| r11 = ∞ | | | |

[Aspheric coefficient]
Surface number r5 C4 = 8.236507E−004 C6 = −4.410039E−004 C8 = 8.316892E−005
C10 = −8.480376E−006 C12 = 2.535400E−007
r7 C4 = 3.513226E−004 C6 = 7.475901E−004 C8 = −1.886682E−004
C10 = 2.626060E−005 C12 = −1.324787E−006
r8 C4 = 1.836866E−002 C6 = −1.727160E−002 C8 = 1.981183E−002
C10 = −1.602779E−002 C12 = 8.034174E−003 C14 = −2.134174E−003
C16 = 2.267634E−004
f2/f = −1.8415

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-035913 filed Feb. 26, 2013, which is hereby incorporated by reference herein in its entirety.

What is claimed is:
1. A finder optical system comprising:
an erecting optical system configured to cause an object image formed on a focusing screen by an imaging optical system to be an erect image;
an eyepiece optical system configured to form the object image caused to be the erect image by the erecting optical system; and
a light metering optical system configured to form the object image focused on the focusing screen, on an image sensor via the erecting optical system,
wherein an optical axis of the light metering optical system is non-parallel to an optical axis of the eyepiece optical system, the light metering optical system includes a first lens having positive refractive power and a second lens having negative refractive power in this order from a side of the erecting optical system to a side of the image sensor, and the second lens is a prism body reflecting a light flux incoming from an incident surface off an inner reflection surface and outputting the light flux from a light outputting surface.

2. The finder optical system according to claim 1, wherein the light outputting surface of the second lens has negative refractive power and is in an aspheric shape in which an absolute value of the refractive power changes increasing from a center to a periphery.

3. The finder optical system according to claim 1, wherein, when a focal length of an entire lens of the light metering optical system is f while a focal length of the second lens is f2, a condition of f2/f<−1.9 is satisfied.

4. The finder optical system according to claim 1, wherein a line normal to a tangent plane at an intersection point of the light outputting surface of the second lens with the optical axis of the light metering optical system and the optical axis of the light metering optical system are non-parallel to each other.

5. The finder optical system according to claim 1, wherein a normal line of the image sensor and the optical axis of the light metering optical system are non-parallel to each other.

6. The finder optical system according to claim 1, wherein a surface of a lens between the focusing screen and the image sensor has a center of curvature that is located off the optical axis of the light metering optical system.

7. The finder optical system according to claim 1, wherein a normal line of a surface of a lens between the focusing screen and the image sensor is inclined toward with respect to a normal line of the image sensor such that it reduces distortions caused by imaging the focusing screen at an angle.

8. An image pickup apparatus comprising the finder optical system according to claim 1.

9. A light metering optical system configured to form an object image focused on a focusing screen, on an image sensor via an erecting optical system, wherein an optical axis of the light metering optical system is non-parallel to an optical axis of an eyepiece optical system for forming the object image via the erecting optical system, the light metering optical system includes a first lens having positive refractive power and a second lens having negative refractive power in this order from a side of the erecting optical system to a side of the image sensor, and the second lens is a prism body reflecting a light flux incoming from a light entrance surface off an inner reflection surface and outputting the light flux from a light outputting surface.

* * * * *